United States Patent Office 3,370,058
Patented Feb. 20, 1968

3,370,058
5-ACYL MORPHANTHRIDINE DERIVATIVES
Claude Iwan Judd, Mequon, and Alexander Emanuel Drukker, Milwaukee, Wis., assignors to Colgate-Palmolive Company, New York, N.Y., a corporation of Delaware
No Drawing. Filed Nov. 27, 1964, Ser. No. 414,424
2 Claims. (Cl. 260—239)

ABSTRACT OF THE DISCLOSURE

The compounds are 5-acyl-5,6-dihydromorphanthridine derivatives which are useful as both pharmaceutically active compounds and intermediates in the preparation of the 11-(substituted aminoalkylidene)-5,6-dihydromorphanthridines which are disclosed and claimed in U.S. Patent No. 3,153,652. A species disclosed is 5-acetyl-11-(3-dimethylamino)propylidene-5,6-dihydromorphanthridine.

---

This invention relates to novel 5-acyl morphanthridine derivatives and processes of preparing such derivatives. More particularly, this invention is concerned with novel 5-acyl-11-aminoalkylidene-5,6 - dihydromorphanthridines, novel intermediates associated with the preparation of these compounds, processes of producing the intermediates and final compounds and pharmacologic and therapeutic uses for such compounds.

The novel 5-acyl-11 - aminoalkylidene - 5,6-dihydromorphanthridines prepared in accordance with the procedure of this invention have the formulae

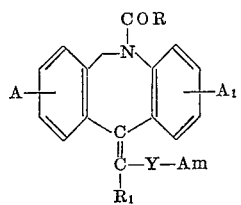  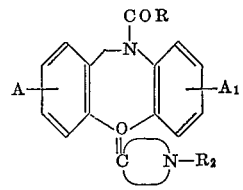

Formula 1    Formula 2 wherein A and $A_1$ are hydrogen, a halo group such as the chloro and bromo groups, a lower alkoxy such as methoxy and ethoxy, a lower alkyl such as methyl and butyl, a lower alkyl-thio such as thiomethyl and thioethyl and trifluoromethyl; R is hydrogen, a lower alkyl such as methyl, ethyl, propyl or butyl, an aryl such as phenyl or an aralkyl such as benzyl or phenethyl, or an O-lower alkyl such as O-methyl or O-butyl or an S-lower alkyl such as S-methyl or S-propyl, $R_1$ is hydrogen, a lower alkyl such as methyl, ethyl, propyl, isopropyl and butyl, a lower alkylene such as allyl, an aryl such as phenyl, an aralkyl such as benzyl, phenylethyl, phenylpropyl and p-chlorobenzyl or a phenyl-lower alkylene such as cinnamyl; $R_2$ is hydrogen, a lower alkyl such as methyl, ethyl, propyl and butyl, a lower alkylene such as allyl, a lower alkynyl such as propargyl, an aralkyl such as benzyl, phenylethyl, phenylpropyl, phenylisopropyl, p-chlorobenzyl, diphenylmethyl, trityl and naphthylmethyl or a phenyl-lower alkylene such as cinnamyl;

is a cyclicamino group such as 3-piperidyl, 4-piperidyl, 3-pyrrolidyl, 3-homopiperidyl and 4-homopiperidyl; Am is a nitrogen-containing group such as a cyclicamino group like 2,3 or 4-pyridyl, 2,3 or 4-piperidyl, 2 or 3-pyrrolidyl, 2,3 or 4-homopiperidyl or quinuclidinyl with or without an N-substituent such as a lower alkyl including methyl, ethyl and propyl, an aryl such as phenyl, an aralkyl such as benzyl, phenethyl, diphenylmethyl, trityl and naphthylmethyl, a lower alkylene such as allyl or a phenyl-lower alkylene such as cinnamyl and Am also represents the group

wherein $R_3$ and $R_4$ are the same or different groups including hydrogen, a lower alkyl such as methyl, ethyl, propyl, isopropyl or butyl, a lower alkenyl such as allyl, an aryl such as phenyl or a nuclear-substituted phenyl, an aralkyl such as benzyl, phenethyl, phenylisopropyl, diphenylmethyl, trityl, naphthylmethyl, a cycloalkyl, particularly cycloalkyl groups having from 5 to 7 carbon atoms such as cyclopentyl, cyclohexyl, a cycloalkyl-lower alkyl such as cyclohexyl-methyl or cyclopentyl-ethyl and groups in which

represents a group such as morpholino, pyrrolidino, piperidino, 1,2,3,4-tetrahydroquinolino, 4-lower alkyl piperazino such as 4-methylpiperazino, 4-(phenyl-lower alkyl)-piperazino such as 4-benzyl-piperazino and 4-(alpha-methylphenethyl) - piperazino and 4-(hydroxy-lower alkyl)-piperazino such as 4-hydroxy-ethylpiperazino and Y is a chemical bond or a straight or branched alkylene of from 1 to 8 carbon atoms such as methylene, ethylene and butylene.

The compounds of Formulae 1 and 2 may be prepared by reacting a 5-acyl-5,6-dihydro-11-morphanthridone with an N-substituted cyclicamino metal or metal halide or with a disubstituted aminoalkyl metal or metal halide to produce a 5-acyl-11-(N-substituted hydroxy cyclicamino)-5,6-dihydromorphanthridine or a 5-acyl-11-hydroxy-11-(disubstituted aminoalkyl)-5,6 - dihydromorphanthridine which upon dehydration yields a 5-acyl-11-[(N-substituted cyclicamino)-ene]-5,6-dihydromorphanthridine or a 5-acyl-11-(disubstituted aminoalkylidene) - 5,6-dihydromorphanthridine. This process can be represented as follows:

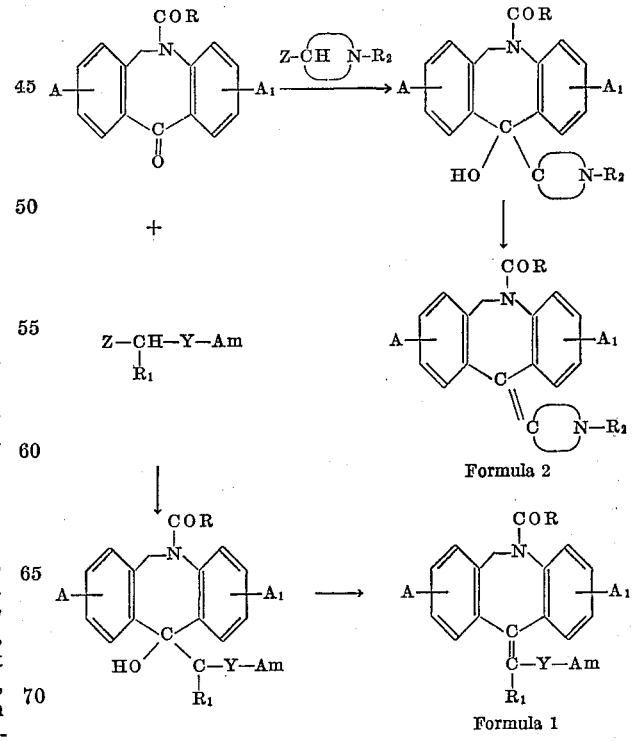

wherein Z is lithium or the group X—M in which X is a reactive halogen and M is a reactive metal such as magnesium (that is, a Grignard reagent), A, A₁, R, R₁, R₂, Y, Am and

have the significance previously assigned but Am is not a primary or secondary amino group and R₂ is not hydrogen.

Examples of some of the 5-acyl-5,6-dihydro-11-morphanthridones which may be employed in this process are:

5-acetyl-5,6-dihydro-11-morphanthridone,
2-chloro-5-acetyl-5,6-dihydro-11-morphanthridone,
2-trifluoromethyl-5-propionyl-5,6-dihydro-11-morphanthridone,
3-methyl-5-butyryl-5,6-dihydro-11-morphanthridone, and
5-benzoyl-5,6-dihydro-11-morphanthridone.

The preparation of the 5-acyl-5,6-dihydro-11-morphanthridones is described later in this specification.

Representative of the disubstituted aminoalkyl metal halides which can be used in this process are:

dimethylaminopropyl magnesium chloride,
diethylaminobutyl magnesium bromide,
dibenzylaminopropyl lithium,
diallylaminopropyl magnesium chloride,
N-methyl-N-benzylaminopropyl magnesium chloride,
diphenylaminopropyl magnesium chloride,
pyrrolidinobutyl magnesium chloride,
homopiperidinopropyl magnesium chloride, and
piperidinopropyl magnesium chloride.

The disubstituted aminoalkyl metal halides used in the first step of this process are Grignard reagents which may be prepared by conventional methods such as those disclosed in United States Patent 2,996,503 and German Patent 1,109,166.

Some of the N-substituted cyclicamino halides which may be employed in the present process are N-substituted piperidyl metal halides, N-substituted pyrrolidyl metal halides, and N-substituted homopiperidyl metal halides such as:

N-methyl-3-piperidyl magnesium chloride,
N-ethyl-4-piperidyl lithium,
N-methyl-3-pyrrolidyl magnesium chloride,
N-ethyl-3-pyrrolidyl lithium,
N-benzyl-3-piperidyl magnesium chloride,
N-benzyl-4-piperidyl magnesium chloride,
N-benzyl-3-pyrrolidyl magnesium chloride,
N-phenethyl-3-pyrrolidyl magnesium chloride,
N-cinnamyl-3-piperidyl magnesium chloride,
N-allyl-4-piperidyl magnesium chloride,
N-methyl-3-homopiperidyl magnesium chloride, and
N-benzyl-4-homopiperidyl magnesium chloride.

The reaction between the N-substituted cyclicamino metal halides or the disubstituted aminoalkyl metal halides and the 5-acyl-5,6-dihydromorphanthridone is conveniently effected by bringing the reactants together in admixture under conditions generally employed in reacting a Grignard reagent with a ketone to form a tertiary alcohol. The reactants are advisedly combined in an anhydrous ether such as ethyl ether, tetrahydrofuran or ethyl ether with benzene. After the reactants have been brought together the mixture can be heated at temperatures up to the reflux temperature in order to promote the reaction. After the reaction is terminated, water is added to the reaction mixture to hydrolyze the Grignard adduct to the desired tertiary alcohol. The resulting product can then be isolated from the mixture such as by evaporating the solvent. The product can then be recrystallized from a suitable medium such as benzene if it is desired.

The same conditions as described above may be employed when an N-substituted cyclicamino lithium or a disubstituted aminoalkyl lithium is used in the reaction.

Examples of some of the 5-acyl-11-hydroxy-11-(N-substituted cyclicamino) - 5,6-dihydromorphanthridines which may be produced in accordance with the above-described procedure are:

5-acetyl-11-hydroxy-11-(N-methyl-4-piperidyl)-5,6-dihydromorphanthridine,
2-chloro-5-acetyl-11-hydroxy-11-(N-ethyl-3-piperidyl)-5,6-dihydromorphanthridine,
5-propionyl-11-hydroxy-11-(N-benzyl-3-pyrrolidyl)-5,6-dihydromorphanthridine,
2-methyl-5-butyryl-11-hydroxy-11-(N-allyl-3-homopiperidyl)-5,6-dihydromorphanthridine, and
5-benzoyl-11-hydroxy-11-(N-methyl-3-piperidyl)-5,6-dihydromorphanthridine.

Examples of some of the 5-acyl-11-hydroxy-11-(disubstituted aminoalkyl)-5,6-dihydromorphanthridines which may be prepared employing the process identified above are:

5-acetyl-11-hydroxy-11-(3-dimethylaminopropyl)-5,6-dihydromorphanthridine,
2-chloro-5-acetyl-11-hydroxy-11-(3-dimethylaminopropyl)-5,6-dihydromorphanthridine,
5-acetyl-11-hydroxy-11-(2-diethylaminopropyl)-5,6-dihydromorphanthridine,
2-chloro-5-acetyl-11-hydroxy-11-(3-dimethylamino-2-methylpropyl)-5,6-dihydromorphanthridine,
5-propionyl-11-hydroxy-11-(diallylaminopropyl)-5,6-dihydromorphanthridine,
5-benzoyl-11-hydroxy-11-(3-dibenzylaminopropyl)-5,6-dihydromorphanthridine,
5-butyryl-11-hydroxy-11-(3-piperidinopropyl)-5,6-dihydromorphanthridine,
5-acetyl-11-hydroxy-11-(2-pyrrolidinoethyl)-5,6-dihydromorphanthridine,
5-acetyl-11-hydroxy-11-(3-dicyclohexylaminopropyl)-5,6-dihydromorphanthridine,
5-acetyl-11-hydroxy-11-(3-N-methyl-N-benzylaminopropyl)-5,6-dihydromorphanthridine,
5-acetyl-11-hydroxy-11-(3-N-methyl-N-benzylamino-2-methylpropyl)-5,6-dihydromorphanthridine, and
5-propionyl-11-hydroxy-11-(3-N-methylpiperazinopropyl)-5,6-dihydromorphanthridine.

The 5-acyl-11-(N-substituted hydroxy cyclicamino)-5,6-dihydromorphanthridines and the 5-acyl-11-hydroxy-11-(disubstituted aminoalkyl) - 5,6-dihydromorphanthridines can be treated with a variety of dehydrating agents to form the 5-acyl-11-[(N-substituted cyclicamino)-ene]-5,6 - dihydromorphanthridines and the 5-acyl-11-(disubsituted aminoalkylidene) - 5,6 - dihydromorphanthridines. Some of these dehydrating agents are acetyl chloride, thionyl chloride, acetic anhydride, potassium bisulfate and concentrated hydrochloric acid. Solvents may be used with the dehydrating agents mentioned above. Examples of some solvents which have been found to be especially preferred are acetyl chloride, chloroform and methylchloride. The reaction may be promoted by heating to a temperature up to the reflux temperature. The dehydration is generally essentially complete in about one hour.

Examples of some of the 5-acyl-11-[(N-substituted cyclicamino) - ene]-5,6-dihydromorphanthridines and 5-acyl - 11 - (disubstituted aminoalkylidene)-5,6-dihydromorphanthridines which may be prepared in this manner are:

5-acetyl-11-(N-methyl-4-piperidylene)-5,6-dihydromorphanthridine,
5-acetyl-11-(N-ethyl-3-piperidylene)-5,6-dihydromorphanthridine,
5-propionyl-11-(N-benzyl-3-pyrrolidylene)-5,6-dihydromorphanthridine,
5-butyryl-11-(N-allyl-3-homopiperidylene)-5,6-dihydromorphanthridine, 5-benzoyl-11-(N-methyl-3-piperidylene)-5,6-dihydromorphanthridine,
5-acetyl-11-(3-dimethylaminopropylidene)-5,6-dihydromorphanthridine,
2-chloro-5-acetyl-11-(3-dimethyl aminopropylidene)-5,6-dihydromorphanthridine,
5-acetyl-11-(2-diethylaminopropylidene)-5,6-dihydromorphanthridine,
2-chloro-5-acetyl-11-(3-dimethylamino-2-methylpropylidene)-5,6-dihydromorphanthridine,
5-propionyl-11-(diallylaminopropylidene)-5,6-dihydromorphanthridine,
5-benzoyl-11-(3-dimethylaminopropylidene)-5,6-dihydromorphanthridine,
5-butyryl-11-(3-piperidinopropylidene)-5,6-dihydromorphanthridine,
5-acetyl-11-(2-pyrrolidinoethylidene)-5,6-dihydromorphanthridine,
5-acetyl-11-(3-dicyclohexylaminopropylidene)-5,6-dihydromorphanthridine,
5-acetyl-11-(3-N-methyl-N-benzylaminopropylidene)-5,6-dihydromorphanthridine,
5-acetyl-11-(3-N-methyl-N-benzylamino-2-methylpropylidene)-5,6-dihydromorphanthridine, and
5-propionyl-11-(3-N-methylpiperazinopropylidene)-5,6-dihydromorphanthridine.

Compounds of Formula 2 wherein $R_2$ is hydrogen may be produced by first blocking the nitrogen with a cleavable group such as a benzyl or a trityl group and subsequently subjecting the compound to reductive, hydrolytic or other cleavage to remove such group. In a like manner compounds of Formula 1 wherein Am is

and $R_3$ and/or $R_4$ are hydrogen may be prepared by first employing a blocking group such as a benzyl or trityl group and after the formation of the morphanthridine removing the blocking groups by subjecting the compounds to reductive, hydrolytic or other cleavage to remove the blocking group to form the primary or secondary amino substituents.

The 5 - acyl - 11-[(N-substituted cyclicamino)-ene]-5,6-dihydromorphanthridines and the 5-acyl-11-(disubstituted aminoalkylidene) - 5,6 - dihydromorphanthridines may be converted to 11-[(N-substituted cyclicamino)-ene]-5,6-dihydromorphanthridines and 11-(disubstituted aminoalkylidene) - 5,6-dihydromorphanthridines by hydrolysis, employing conventional techniques such as by heating them in the presence of a base such as sodium hydroxide or potassium hydroxide or in the presence of an acid such as hydrochloric or sulfuric. These reactions can be presented as follows:

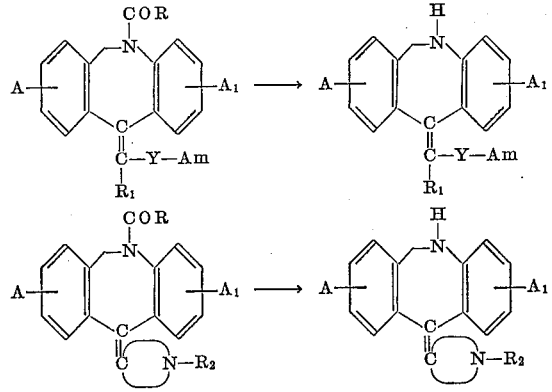

wherein A, $A_1$, R, $R_1$, $R_2$, Y, Am and

have the significance previously assigned.

Examples of some of the compounds which may be prepared in this manner are:

11-(N-methyl-4-piperidylene)-5,6-dihydromorphanthridine,
11-(N-ethyl-3-piperidylene)-5,6-dihydromorphanthridine,
11-(N-cinnamyl-4-piperidylene)-5,6-dihydromorphanthridine,
11-(N-methyl-3-pyrrolidylene)-5,6-dihydromorphanthridine,
11-(N-ethyl-3-pyrrolidylene)-5,6-dihydromorphanthridine,
11-(N-allyl-3-piperidylene)-5,6-dihydromorphanthridine,
11-(3-piperidylene)-5,6-dihydromorphanthridine,
11-(3-pyrrolidylene)-5,6-dihydromorphanthridine,
11-(3-homopiperidylene)-5,6-dihydromorphanthridine,
11-(4-piperidylene)-5,6-dihydromorphanthridine,
11-(1-methyl-2-piperidinoethylidene)-5,6-dihydromorphanthridine,
2-chloro-11-(3-dimethylaminopropylidene)-5,6-dihydromorphanthridine,
11-(3-pyrrolidinopropylidene)-5,6-dihydromorphanthridine,
2-chloro-11-(2-methyl-3-dimethylaminopropylidene)-5,6-dihydromorphanthridine,
11-(3-methylaminopropylidene)-5,6-dihydromorphanthridine,
11-(3-methylamino-2-methylpropylidene)-5,6-dihydromorphanthridine,
11-[3-(4-methylpiperazino)-propylidene]-5,6-dihydromorphanthridine,
11-(1-allyl-3-homopiperidinopropylidene)-5,6-dihydromorphanthridine,
11-(3-dimethylaminobutylidene)-5,6-dihydromorphanthridine,
11-[2-(N-ethyl-3-piperidyl)-ethylidene]-5,6-dihydromorphanthridine, and
11-[(N-methyl-2-pyrrolidyl)-methylidene]-5,6-dihydromorphanthridine The 11-[(N-substituted cyclicamino)-ene]-5,6-dihydromorphanthridines as well as the 11-(substituted aminoalkylidene)-5,6-dihydromorphanthridines prepared as set forth above are more fully described in United States Patent No. 3,153,652 and in applicants' co-pending application, Ser. No. 316,512, filed Oct. 16, 1963.

It has also been discovered according to the present invention that 5-acyl-5,6-dihydro - 11 - morphanthridones may be prepared by acylating the 5,6-dihydromorphanthridine to form a 5-acyl-5,6-dihydromorphanthridine and oxidizing the 5-acyl-5,6-dihydromorphanthridine so formed with a suitable oxidizing agent to produce the desired 5-acyl-5,6-dihydro - 11 - morphanthridone. This process may be represented as follows:

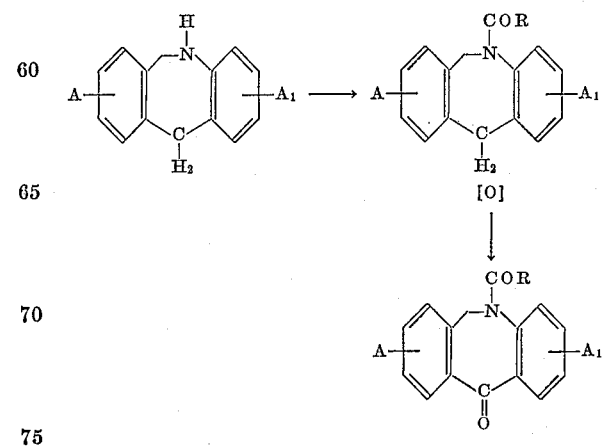

wherein A, A₁ and R have the significance previously assigned.

The conversion of the 5,6-dihydromorphanthridine to the 5-acyl-5,6-dihydromorphanthridine can be readily effected by acylating by conventional means such as by adding an acyl halide, anhydride or ester to the 5,6-dihydromorphanthridine. It is desirable to dissolve the 5,6-dihydromorphanthridine in a suitable solvent such as benzene, toluene or xylene. The reaction may be promoted by heating; the reflux temperature is especially preferred. The reaction is generally complete in from about one to four hours, after which the reaction mixture is cooled, neutralized and the desired product isolated by conventional procedures.

Examples of some of the acylating agents which may be employed in this reaction are:

acetyl chloride,
acetyl fluoride,
acetyl bromide,
propionyl chloride,
propionyl iodide,
n-butyryl chloride,
isobutyryl fluoride,
benzoyl chloride,
benzoyl iodide,
acetic anhydride,
propionic anhydride,
ethyl formate,
benzyl formate,
ethyl chlorocarbonate, and
butyl chlorothiocarbonate.

Examples of some of the 5-acyl-5,6-dihydromorphanthridines thus prepared are:

5-acetyl-5,6-dihydromorphanthridine,
5-propionyl-5,6-dihydromorphanthridine,
5-n-butyryl-5,6-dihydromorphanthridine,
5-isobutyryl-5,6-dihydromorphanthridine,
5-benzoyl-5,6-dihydromorphanthridine,
5-carbethoxy-5,6-dihydromorphanthridine, and
5-thiobutylcarbonyl-5,6-dihydromorphanthridine.

The oxidation of the 5-acyl-5,6-dihydromorphanthridines can be effected by treating them with an oxidizing agent such as chromium trioxide in a mineral acid, an alkali metal bichromate, potassium permanganate, or hydrogen peroxide. A solvent such as a lower aliphatic acid or an inert solvent such as benzene or dioxane may be employed. The reaction is promoted by heating to a temperature of from about 100–150° C. Representative examples of the 5-acyl-5,6-dihydro-11-morphanthridones which result from this oxidation are set forth near the beginning of this specification.

The compounds identified by Formulae 1 and 2 of this invention form water soluble acid addition salts with inorganic or organic acids such as hydrochloric acid, hydrobromic acid, sulfonic acid, phosphoric acid, methane sulfonic acid, ethane disulfonic acid, acetic acid, nitric acid, maleic acid, succinic acid, tartaric acid, benzoic acid, phthalic acid and cyclohexyl sulfamic acid. The compounds also form lower alkyl quaternary ammonium salts such as methyl chloride, ethyl bromide and diethyl sulphate.

The compounds of this invention identified by Formulae 1 and 2, that is, the 5-acyl-11-[(N-substituted cyclicamino)-ene]-5,6-dihydromorphanthridines and the 5-acyl-11-(substituted aminoalkylidene)-dihydromorphanthridines as well as their acid addition salts have anticholinergic and analgetic activity. These compounds also possess antispasmodic, antitremor, antidepressant and tranquilizing properties. These compounds may also be used as intermediates in the preparation of 11-[(N-substituted cyclicamino)-ene]-5,6-dihydromorphanthridines and 11-(substituted aminoalkylidene)-5,6-dihydromorphanthridines as more fully described hereinabove. These latter compounds are more fully described in United States Patent No. 3,153,652 and in applicants' co-pending United States patent application Ser. No. 316,512, filed Oct. 16, 1963. These compounds possess antispasmodic, antitremor, antidepressant and tranquilizing properties. In addition, these compounds are antipsychotic, antianxiety mood elevating and mood leveling agents. They are skeletal muscle relaxants and also reduce aggressiveness.

The compounds can be administered to animals as pure compounds as the bases or in the form of a pharmaceutically acceptable nontoxic acid addition salt. However, to obtain a more practical size to dosage relationship, one or more of the compounds is generally combined with a suitable pharmaceutical carrier and made into unit dosage forms. These dosage forms may be made for either oral or parenteral administration.

Pharmaceutical carriers which are either liquid or solid may be employed. The preferred liquid carrier is water. However, in the event the compound is not soluble or miscible in water, an organic solvent such as ethylene glycol may be employed. Flavoring materials may be included if desired.

Solid pharmaceutical carriers such as starch, sugar and talc can be utilized to form powders. These powders can be used as such or can be tableted or used to fill gelatin capsules. Suitable lubricants such as magnesium stearate, binders such as gelatin and distintegrating agents such as sodium carbonate in combination with citric acid may be employed in the formation of the tablets.

The following examples are presented to illustrate this invention:

*Example I.—5-acetyl-5,6-dihydromorphanthridine*

To a solution of 39 g. (0.2 mole) of 5,6-dihydromorphanthridine in 500 ml. of benzene is added dropwise 25.6 g. (0.25 mole) of acetyl chloride. The solution is refluxed for 2 hours, stirred with water, the organic layer is separated, washed with bicarbonate solution and water, dried over potassium carbonate, filtered, and concentrated. The residue is recrystallized from 300 ml. of boiling ethanol to give the product, melting point 145–147° C.

*Analysis.*—Calcd. for $C_{16}H_{15}NO$: C, 80.98; H, 6.37; N, 5.90. Found: C, 81.16; H, 6:12; N, 6.02.

*Example II.—5-acetyl-5,6-dihydro-11-morphanthridone*

A solution of 7.12 g. (0.03 mole) of 5-acetyl-5,6-dihydromorphanthridine and 350 ml. glacial acetic acid is stirred and heated to reflux. Chromium trioxide (8.8 g.) is added scoopwise. The dark green reaction mixture is refluxed for 3 hours, and concentrated in vacuo. The resulting oil is picked up in water, extracted with ether, washed with water once, and aqueous sodium bicarbonate until it becomes neutral. The ethereal extract is dried over potassium carbonate, filtered, concentrated to give the product, which is a yellow solid, melting point 97–100° C.

*Analysis.*—Calcd. for $C_{16}H_{13}NO_2$: C, 76.46; H, 5.22; N, 5.58. Found: C, 76.53; H, 5.19; N, 5.64.

*Example III.—5-acetyl-11-(3-dimethylamino)propylidene-5,6-dihydromorphanthridine*

To a Grignard solution, prepared from 5.35 g. (0.22 atom) of magnesium and 26.0 g. (0.22 mole) of 3-dimethylaminopropyl chloride in 300 ml. of tetrahydrofuran is added dropwise 25.1 g. (0.1 mole) of 5-acetyl-5,6-dihydro-11-morphanthridone in 150 ml. of tetrahydrofuran, and the mixture is stirred overnight at room temperature. The complex is decomposed by addition of ammonium chloride solution, the mixture is filtered, and the filtrate is concentrated. The residue is taken up in benzene, and the benzene layer is extracted with dilute hydrochloric acid. The aqueous acid layer is made alkaline with potassium hydroxide, and is extracted with chloroform. The chloroform solution is dried over potassium carbonate and concentrated to leave 18 g. of the carbinol. This carbinol is again dissolved in 250 ml. of chloroform, treated with hydrochloric acid until the pH reaches 1, and a solution of 17 g. of acetyl chloride in 50 ml. of chloroform is added dropwise. The resulting solution is refluxed for two hours, taken to dryness, dissolved in water, the aqueous solution is washed with ether, and made alkaline with potassium hydroxide. The resulting oil is extracted with ether, dried over potassium carbonate, and concentrated to leave a residue, which is distilled to give the product, boiling point 200–210° C. (0.17 mm.).

*Analysis.*—Calcd. for $C_{21}H_{24}N_2O$: C, 78.70; H, 7.55; N, 8.75. Found: C, 78.44; H, 7.76; N, 9.00.

*Example IV.—11-(3-dimethylamino)propylidene-5,6-dihydromorphanthridine*

A solution of 5 g. (0.0156 mole) of 5-acetyl-11-(3 - dimethylamino) - propylidene - 5,6-dihydromorphanthridine in 150 ml. of 38% hydrochloric acid is stirred and refluxed for 18 hours. The solution is made alkaline with potassium hydroxide and extracted with ether. The ethereal solution is dried, concentrated, and the residue is distilled to give the product, which is a light yellow clear oil, boiling point 200–210° C. (1.3 mm.).

*Analysis.*—Calcd. for $C_{19}H_{22}N_2$: C, 81.97; H, 7.97; N, 10.06. Found: C, 81.72; H, 7.80; N, 10.30.

We claim:
1. A compound of the formula

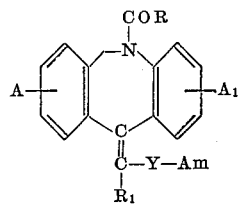

in which A and $A_1$ are members selected from the group consisting of hydrogen, halogen, lower alkoxy, lower alkyl, lower alkyl-thio and trifluoromethyl, R is a lower alkyl group, $R_1$ is selected from hydrogen and lower alkyl, Y is a lower alkylene and Am is the group

in which $R_3$ and $R_4$ are members selected from the group consisting of hydrogen, lower alkyl and phenyl-lower alkyl.

2. 5 - acetyl - 11 - (3-dimethylamino)propylidene-5,6-dihydromorphanthridine.

References Cited

UNITED STATES PATENTS 3,046,283   7/1962   Engelhardt.
3,192,204   6/1965   Craig et al.

ALTON D. ROLLINS, *Primary Examiner.*